United States Patent Office 3,166,469
Patented Jan. 19, 1965

3,166,469
PESTICIDAL COMPOSITION
Herbert A. Pass, St. Lambert, Quebec, Michael S. H. Nurse, Lachine, Quebec, and Beresford J. Watt, Valois, Quebec, Canada, assignors to The Sherwin-Williams Company of Canada Limited, Green Cross Division, Montreal, Quebec, Canada
No Drawing. Filed June 11, 1962, Ser. No. 201,735
Claims priority, application Canada, June 13, 1961, 825,575
10 Claims. (Cl. 167—22)

This invention relates to a pesticidal composition and a method of fungus control to condition fruits for vending.

Apple scab is a major plague to apple producers. Attempts have been made to control this disease using glyodin as a protective fungicide. This is effective when the glyodin is put on ahead of time, but glyodin has no eradicant effect if applied after a scab infection period. Dodine is a fungicide which protects systemically against apple scab and has an eradicant effect. However, the use of this agent at the concentrations required to protect effectively against apple scab causes russetting and consequent downgrading of the apples so affected.

The applicants have now found that, if glyodin and dodine are used together at reduced rates compared with those normally employed to produce the individual effects of these substances as a protective fungicide and a systemic fungicide respectively, effective control may be had over apple scab with less russetting than where dodine at normal effective rates is used alone. Compositions containing both glyodin and dodine are therefore effective in fungicidal control, for example against apple scab, while causing less fruit russetting than an effective amount of dodine alone, and providing superior disease control to glyodin alone, when applied to pome and stone fruits. The invention is also applicable to controlling fungal attack of other pome fruits, including pears and quinces, and of stone fruits, including cherries, plums and peaches.

The ability to combine glyodin and dodine in an effective composition is quite unexpected, as these substances were previously not known to be compatible and could readily have produced a phytotoxic effect. Besides, there was no way of knowing that the scab control could be brought about without the normal russetting which is expected from the use of dodine.

Glyodin is normally available as a solution containing 30% by weight 2-heptadecyl glyoxalidine acetate dissolved in isopropanol. It is also commercially available in a wettable powder form containing 75% by weight of glyoxalidine ("free base"). Thus the term glyodin refers to either the free base (2-heptadecyl glyoxalidine) or the acetate form (2-heptadecyl glyoxalidine acetate). Dodine is normally available as a wettable powder formulation containing 65% by weight of n-dodecyl guanidine acetate.

According to the invention, the glyodin and dodine are mixed in water in concentrations suitable for spraying on fruit trees. Alternatively a dry wettable powder composition containing both glyodin and dodine can be formulated into a single ready-to-use product.

The following ranges of glyodin and dodine expressed in ounces per 100 gallons of water as a dilute (hydraulic) spray are effective in a pesticidal composition according to the invention.

|  | Ounces |
|---|---|
| Glyodin | 0.5–10 |
| Dodine | 5.2–.65 |

Effective results in terms of disease control, particularly fungal disease, specially apple, pear and peach scab, cherry leaf spot, and brown rot of peaches and plums, are obtained by using any amount of either constituent within these ranges. The same proportions to each other of the active constituents hold for other total hydraulic mixture concentrations, for example, two times to ten times the total amount of dodine plus glyodin as given above, as well as for dry mixtures.

In use, compositions according to the invention were applied by spraying at the delayed dormant stage and then again about a week later and regularly to the end of the second cover spray. The intent of the invention also covers the use of this combination from a single spray to usage in a full seasonal program.

The use of the compositions and method of the invention results in the following advantages:

(a) Oustanding scab control.
(b) Reduction of the russetting which normally occurs with use of dodine alone.
(c) Safe use of an eradicant or local systemic in bloom or into the cover sprays.
(d) Mite suppression supplied by glyodin in a continuous program.
(e) Low side effects.

Gallons and ounces as used in this application are Imperial measures.

The invention has been generally described and will now be referred to in more detail by reference to the accompanying examples, illustrating preferred compositions and procedures.

Example 1

Into a 400 gallon tank of water, were put, with agitation, one pound of dodine (65% wettable powder) and two Imperial quarts of glyodin (30% solution) until mixed thoroughly.

This aqueous mixture was sprayed onto apple trees at the delayed dormant stage, again about a week later, then regularly to the end of the second cover spray. Excellent results were obtained in terms of the advantages mentioned above.

Example 2

The same mixture, as in Example 1, was applied in a concentrate machine at four time the concentration of Example 1, putting it on in mist form. Excellent results were achieved in terms of the advantages mentioned above.

A typical dry product has the following composition.

| Constituent: | Pounds per 1000 pounds |
|---|---|
| 65% dodine | 334.0 |
| Glyoxaline tech. | 405.5 |
| Acetic acid | 11.5 |
| Cationic wetting agent "Catanac SN" (American Cyanamid) | 35.0 |
| "Microcel E" | 214.0 |
| Antifoaming agent "SAG 470" | Traces |

The dry materials are blended together, the acetic acid sprayed on the blend and the resulting mass micronized, if desired. The glyoxaline reacts at least partially with the acetic acid to form glyoxalidine acetate (glyodin). The resulting product is used as a wettable powder to form a dilute hydraulic spray preferably 12 ounces to 100 gallons, although the amount of water is not critical. For dry application the mixture described is blended with a dry carrier, for example finely divided talc or pyrophyllite.

Other active substances may be added to the spray tank mixture or the dry mix, for example other pesticides for instance insesticides or miticides, without affecting the fungicidal efficiency.

In liquid form the products are generally applied by the use of a concentrate or dilute sprayer and in dry form by ground dusters or by airplane dusting.

We claim:

1. A synergistic pesticidal composition, comprising, as essential active constituents glyodin and dodine in the proportion of from about 0.5 part by weight to about 10 parts by weight of glyodin and from about 5.2 parts by weight to about 0.65 part by weight of dodine calculated on the basis of the pure substances.

2. A synergistic pesticidal composition, comprising, a dilute spraying mixture of glyodin and dodine in an aqueous vehicle in the proportion of from about 0.5 part by weight to about 10 parts by weight of glyodin and from about 5.2 parts by weight to about 0.65 part by weight of dodine calculated on the basis of the pure substances.

3. A synergistic pesticidal composition, comprising, a dry mixture containing glyodin and dodine as essential active constituents, a wetting agent, and an inert finely divided carrier, the active constituents being present in the proportion of from about 0.5 part by weight to about 10 parts by weight of glyodin and from about 5.2 parts by weight to about 0.65 part by weight of dodine calculated on the basis of the pure substances.

4. A method for the control of fungus diseases on fruits, comprising, applying glyodin and dodine simultaneously to the locus to be treated in the proportion of from about 0.5 part by weight to about 10 parts by weight of glyodin and from about 5.2 parts by weight to about 0.65 part by weight of dodine calculated on the basis of the pure substances.

5. A synergistic pesticidal composition comprising as essential active constituents glyodin and dodine in the proportion of about 1.9 parts by weight of glyodin for each part by weight of dodine calculated on the basis of the pure substance.

6. A synergistic pesticidal composition comprising a dilute spraying mixture of glyodin and dodine in an aqueous vehicle in the proportion of about 1.9 parts by weight of glyodin for each part by weight of dodine calculated on the basis of the pure substances.

7. A synergistic pesticidal composition, comprising, a dry mixture containing glyodin and dodine as essential active constituents, a wetting agent, and an inert finely divided carrier, the active constituents being present in the proportion of about 1.9 parts by weight of glyodin for each part by weight of dodine calculated on the basis of the pure substances.

8. A method for the control of fungus diseases on fruits, comprising, applying glyodin and dodine simultaneously to the locus to be treated in the proportion of about 1.9 parts by weight of glyodin for each part by weight of dodine calculated on the basis of the pure substances.

9. A synergistic pesticidal composition comprising as essential active constituents glyodin and dodine in the proportion of between 0.80 and 15 parts by weight of glyodin for each part by weight of dodine.

10. A synergistic pesticidal composition comprising as essential active constituents glyodin and dodine in the proportion of between 4.8 parts by weight of glyodin for each 1.3 parts by weight of dodine.

References Cited by the Examiner

UNITED STATES PATENTS 2,867,562   1/59   Lamb ---------------- 167—22

OTHER REFERENCES

Frear: Pesticide Index, College Science Publishers, State College, Pa., 1961, pp. 101, 114.

LEWIS GOTTS, *Primary Examiner.*

J. S. LEVITT, *Examiner.*